March 18, 1930.  W. ADAM  1,751,186
SAFETY BUMPER ACTUATED CONTROL FOR VEHICLES
Filed Aug. 15, 1928    2 Sheets-Sheet 2
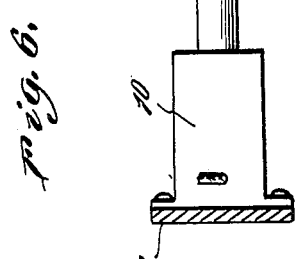
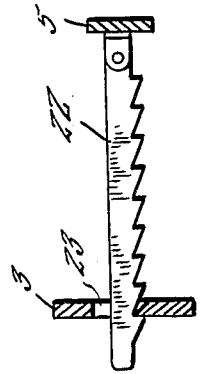
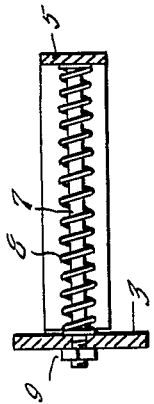
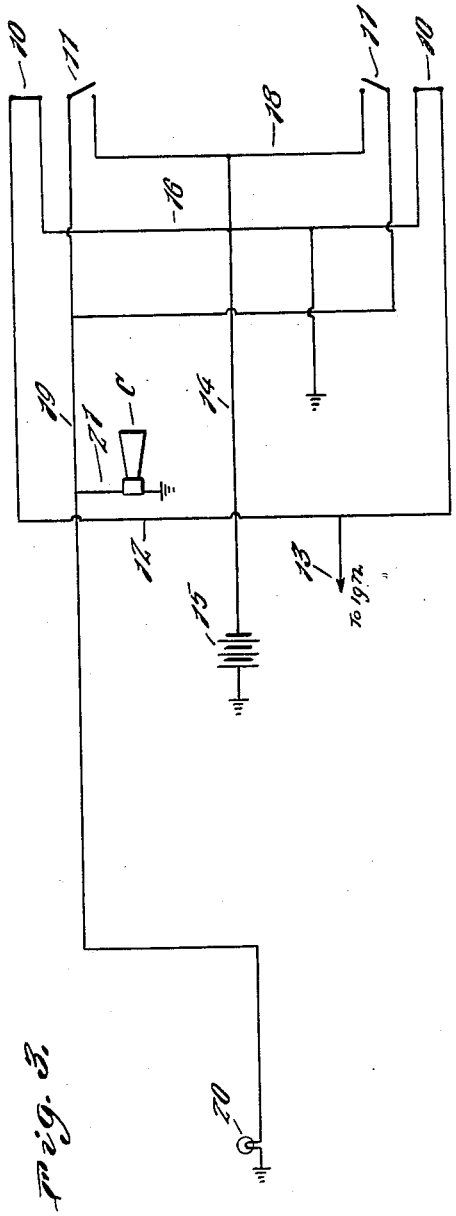
Inventor
*William Adam*
By *Clarence A. O'Brien*
Attorney Patented Mar. 18, 1930

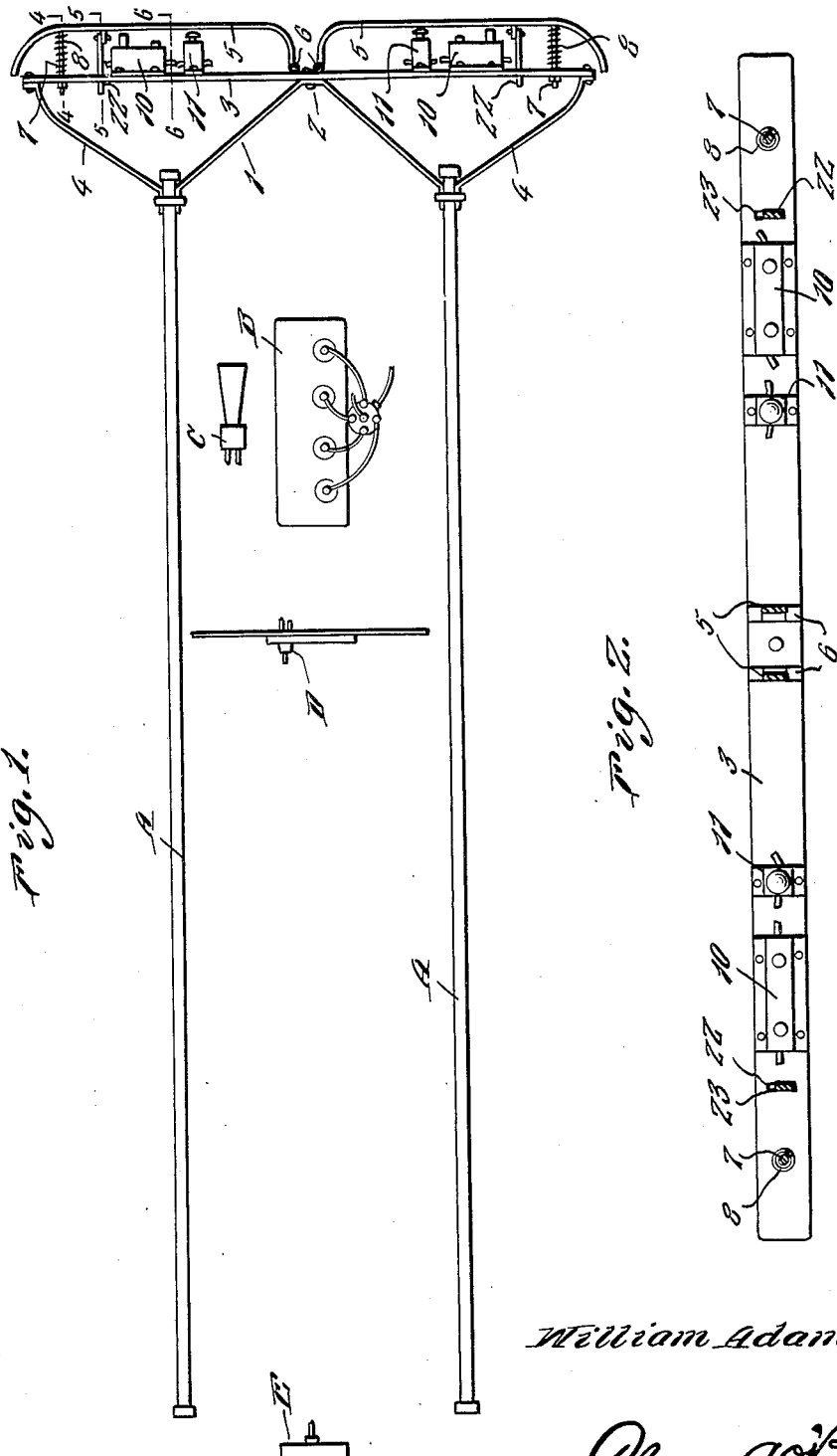

1,751,186

UNITED STATES PATENT OFFICE

WILLIAM ADAM, OF STAUNTON, ILLINOIS

SAFETY BUMPER-ACTUATED CONTROL FOR VEHICLES

Application filed August 15, 1928. Serial No. 299,814.

The present invention pertains to new and useful improvements in safety devices for vehicles and especially for motor vehicles, the prime object of the same being to provide means whereby the vehicle will be brought to a stop immediately upon collision with some object, simultaneously sounding an alarm and indicating to rear approaching vehicles the fact that the vehicle in collision has stopped or is about to stop. The purpose of the invention is to eliminate the generally illegal practice of unscrupulous persons to immediately leave the scene of an accident without exchanging the proper information between the parties involved.

The present invention will serve to check the control of the vehicle from the driver upon the contact of the vehicle with an object with sufficient impact to actuate switch devices, contemplated to shut off the ignition system and simultaneously sound an alarm to notify nearby persons of the accident so that eye witnesses may be had.

Another important object of the invention resides in the provision of a novel bumper structure for motor vehicles, wherein means is provided for supporting several switch devices, certain ones of which are interposed in the ignition system and are normally closed, while the remaining devices are normally open and interposed in the usual horn circuit, so that the operation of these switch devices will act to simultaneously shut off the ignition system and sound an alarm.

After considering the following specification and claims, other important objects and advantages of the invention will become apparent.

In the drawings:

Figure 1 represents a top plan view of the improved bumper with the spring devices arranged in association therewith and further showing other units of the conventional vehicle in substantially their proper positions with respect to the parallel chassis bars of the vehicle.

Figure 2 is a front side elevation of the elongated plate arranged at the front of the vehicle, this figure being taken on a line through the spring members arranged in front of the plate in the manner shown in Figure 1.

Figure 3 is a diagrammatic view of the wiring connections to the various electrical devices.

Figure 4 is a transverse sectional view of the bumper structure taken substantially on the line 4—4 of Figure 1.

Figure 5 is another transverse sectional view of the bumper structure, taken substantially on the line 5—5, and Figure 6 is still another transverse sectional view of the bumper structure, taken substantially on the line 6—6 of Figure 1.

Referring to the drawings, wherein like numerals designate like parts A—A indicate the usual longitudinally extending bars.

The engine B is supported upon these bars in the usual manner, not shown in the drawings, while the horn C and the ignition switch D are supported upon suitable superstructure also not shown in the drawings, but with which the present invention is associated.

In Figure 1 of the drawings, a conventional stop light signal box E is shown, in substantially its proper position at the rear of the bars A—A upon which the vehicle body is mounted.

At the forward end of the chassis a V-shaped bar 1 has its respective ends secured to the adjacent ends of the bars A—A. The apex portion 2 of this bar is flattened as shown. An elongated flat bar 3 is secured at its intermediate portion to the flattened apex portion 2, of the bar 1, while brace members 4—4 serve to brace the ends of the bars 3, against the adjacent ends of the chassis bars A—A.

A pair of bumper bars 5—5 are of substantially U-shape, the bight portions thereof being elongated, one end of each bumper bar being hingedly connected at 6, to the intermediate portion of the flat bar 3, while the free ends thereof curve rearwardly and are disposed slightly beyond the ends of the flat bar, 3. An elongated member 7 is connected at one end to each bumper bar 5, adjacent its free end and is slidably disposed through an opening in the adjacent end portion of the flat plate 3.

A spring 8 is convoluted about the member 7 and interposed between the bumper bar 5 and the flat face 3 so as to normally urge the bumper bar to a certain predetermined spaced relation from the flat bar 3, which relation is fixed by the threaded disposition of a nut 9 on the free end of the member 7.

Arranged inwardly from each bumper bar 5 are a pair of switch devices 10 and 11 respectively. The switch devices 10 are normally closed and are connected, at one of their sides by a wire 12, having connection by the lead 13 to the engine ignition. A lead 14 from the battery 15, supplies current to a connector 16 bridging the opposite sides of the switch devices 10. Obviously, when the usual ignition switch of the vehicle is open, a complete circuit is maintained through the switches 10 to the motor. The switch devices 11 have one of their sides bridged by a connector 18, which connector is connected with the battery lead 14, in the manner diametrically shown in Figure 3. The opposite sides of the switches 11 are connected to a conductor 19, which extends through the usual stop light bulb 20 to ground and through a branch wire 21 to the vehicle horn C.

A rack bar 22 is pivotally connected to each of the bumper bars 5, while its free end is disposed through an opening 23 in the flat bar 3.

Obviously, when the vehicle upon which this safety device has been mounted collides with some object with sufficient impact to actuate the switch devices 10 and 11 respectively, the operated disposition of the switch devices will be maintained by the engagement of the teeth of the rack bar 22 with the edge of the opening 23 in the flat bar 3. As a result of this, the opening of the ignition system will stop the motor, while the closing of the switch devices 11 will sound the horn C, and simultaneously illuminate the stop light 20.

Having thus described the invention, what is claimed as new is:

A bumper operated switch comprising a pair of bars, one of said bars being secured rigidly to a stationary structure, yieldable means for mounting the other bar in substantially parallel relation with respect to the rigidly secured bar, said last mentioned bar being provided with an opening, a pivotally mounted rack bar on the yieldably mounted bar for disposition through said opening in the rigidly secured bar, and switch means interposed between the said bars.

In testimony whereof I affix my signature.

WILLIAM ADAM.